(12) United States Patent
Brutin (10) Patent No.: US 9,042,524 B2
(45) Date of Patent: May 26, 2015

(54) SYSTEMS AND METHODS FOR PROXIMITY-ACTIVATED VOICE RECORDING

(71) Applicant: John Joel Brutin, Cambridge (CA)

(72) Inventor: John Joel Brutin, Cambridge (CA)

(*) Notice: Subject to any disclaimer, the term of this patent is extended or adjusted under 35 U.S.C. 154(b) by 0 days.

(21) Appl. No.: 13/919,986

(22) Filed: Jun. 17, 2013

(65) Prior Publication Data

US 2014/0369478 A1 Dec. 18, 2014

(51) Int. Cl.
*H04M 1/64* (2006.01)
*H04M 3/42* (2006.01)

(52) U.S. Cl.
CPC ................................. *H04M 3/42221* (2013.01)

(58) Field of Classification Search
CPC .......................... H04M 3/42221; H04M 1/276
USPC ............................... 704/246; 455/575; 379/68
See application file for complete search history.

(56) References Cited

U.S. PATENT DOCUMENTS

| | | |
|---|---|---|
| 6,211,790 B1 | 4/2001 | Radomsky et al. |
| 7,259,671 B2 | 8/2007 | Ganley et al. |
| 7,893,842 B2 | 2/2011 | Deutsch |
| 2008/0231462 A1 | 9/2008 | Hobart |
| 2010/0278345 A1 | 11/2010 | Alsina et al. |
| 2011/0003614 A1 | 1/2011 | Langereis et al. |
| 2012/0262581 A1 | 10/2012 | Carter |
| 2012/0264446 A1 | 10/2012 | Xie et al. |
| 2012/0299731 A1 | 11/2012 | Triener |
| 2013/0059284 A1 | 3/2013 | Giedgowd et al. |
| 2013/0080179 A1 | 3/2013 | White |
| 2014/0046664 A1* | 2/2014 | Sarkar et al. .................. 704/246 |

* cited by examiner

*Primary Examiner* — Simon King
(74) *Attorney, Agent, or Firm* — Bereskin & Parr LLP (57) ABSTRACT

According to one aspect, a proximity-activated voice recording system having at least two proximity-activated voice recording devices. Each voice-activated recording device may include a first proximity sensor for detecting a proximity defined by a device communications distance, and an identification token that contains first identification information for identifying the voice-activated recording device. In some cases, each device may have a second proximity sensor for detecting a proximity defined by a vocal communications distance.

17 Claims, 6 Drawing Sheets

SYSTEMS AND METHODS FOR PROXIMITY-ACTIVATED VOICE RECORDING

TECHNICAL FIELD

The embodiments herein relate to sound recorders, and in particular, to methods and systems for automatically activating a sound recorder for the purposes of recording interpersonal vocal communications.

INTRODUCTION

Vocal communications play an integral role in many aspects of human behaviour. In particular, vocal communications are often very important to maintaining inter-personal relationships. Conversations that take place between two or more people provide an opportunity to express emotions, exchange information, and collectively make decisions.

While vocal communications are important for inter-personal relationships, miscommunications can have a detrimental effect. For example, information provided during a conversation may be lost in memory, for instance through passive memory lapse or through active denial. Certain phrases that were intended to have a particular meaning as expressed by one person may be misinterpreted to have a different meaning by another person. Furthermore, the interpretation of the meaning of a phrase may be dependent on the context in which the phrase was provided, for example an earlier portion of a conversation.

Currently, it is possible to record vocal conversations using a conventional voice recorder. Some conventional voice recorders contain a microphone for sensing sounds, a storage medium, and a processing device for recording the sensed sound to the storage medium. Conventional voice recorders often include a speaker for playing back the recorded sound, and may be battery-operated to allow for portability.

A conventional voice recorder is typically equipped with buttons to manually operate the functions of the voice recorder. These buttons might include a "record" button for manually activating the writing of the sensed sound to the medium (the recording process), a "pause" button for temporarily pausing the recording process, and a "stop" button for stopping the recording process. Some other buttons may be linked to other functions, such as fast-forward and rewind capabilities, as well as a "play" button to manually enable playback of recorded audio.

BRIEF DESCRIPTION OF THE DRAWINGS

Various embodiments will now be described, by way of example only, with reference to the following drawings, in which.

DESCRIPTION OF SOME SPECIFIC EMBODIMENTS

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems and methods described herein may be implemented in hardware or software, or a combination of both.

In some cases, embodiments may be implemented in one or more computer programs executing on one or more programmable computing devices including at least one processor, a data storage device (including in some cases volatile and non-volatile memory and/or data storage elements), at least one input device, and at least one output device.

In some embodiments, each program may be implemented in a high level procedural or object-oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

In general, it has been discovered that conventional voice recorders may not be suitable for certain situations in which two or more people in a relationship want to automatically record conversations between each other over a period of time without the need to manually activate a voice recorder. In particular, the need to manually start and stop a voice recorder (i.e., through the operation of a manual button) tends to interrupt the natural flow of the conversation between two or more people and can be disruptive.

It is noted that some sound-activated recorders are known. However, these sound-activated recorders tend to be activated by any sound of a sufficient volume or intensity, regardless of any particular context. Thus, conventional sound-activated recorders will often record sounds that are unrelated to a particular conversation between two or more people, which may be undesirable.

Figure 1:
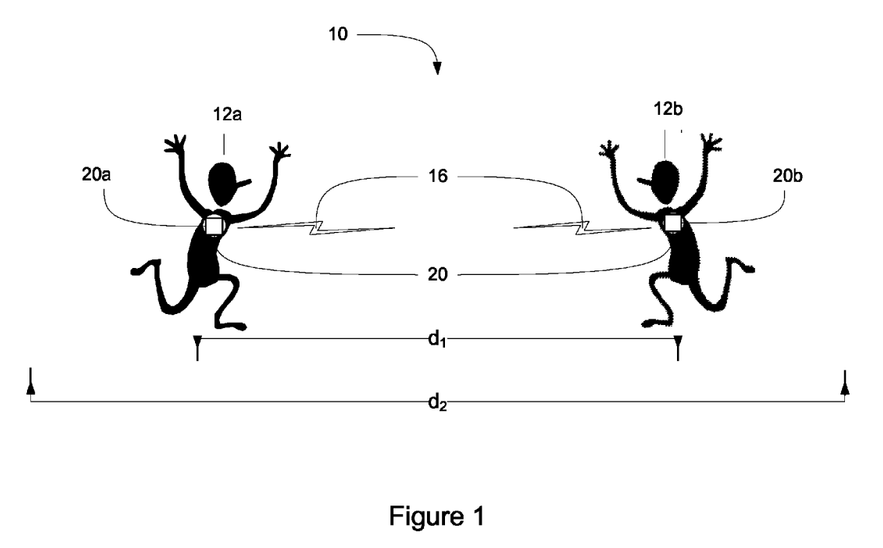
FIG. 1 is a schematic diagram of a proximity-activated voice recording system according to some embodiments.

Referring to FIG. 1, illustrated therein is a proximity-activated voice recording system 10 according to one embodiment. A first user 12a and a second user 12b are each equipped with a proximity-activated voice recording device 20. For example, the first user 12a may be equipped with a first proximity-activated voice recording device 20a, and the second user 12b may be equipped with a second proximity-activated voice recording device 20b. In some cases, the proximity-activated voice recording devices 20 may include wireless transceivers for sending or receiving wireless communications signals 16 (or both).

Figure 2A:
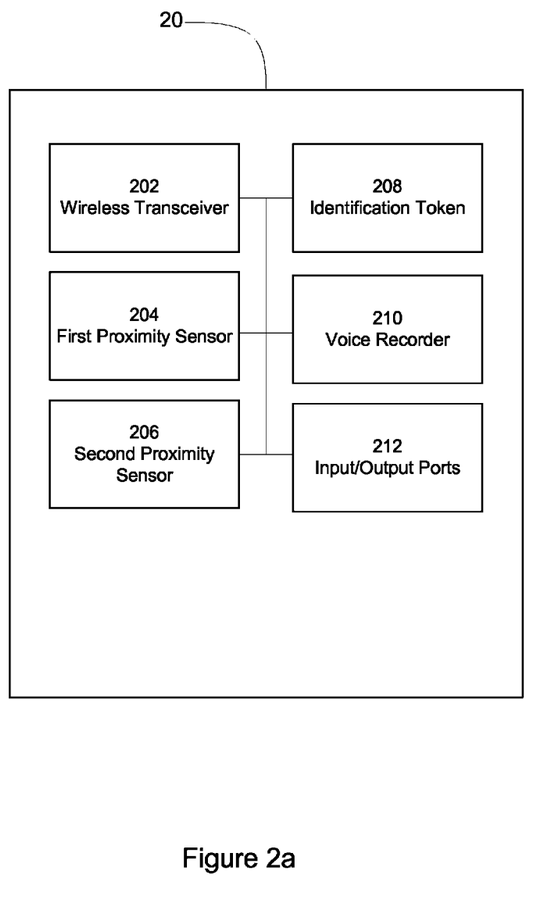
FIG. 2a is a schematic diagram of an example embodiment of a proximity-activated voice recording device according to some embodiments.
Figure 2B:
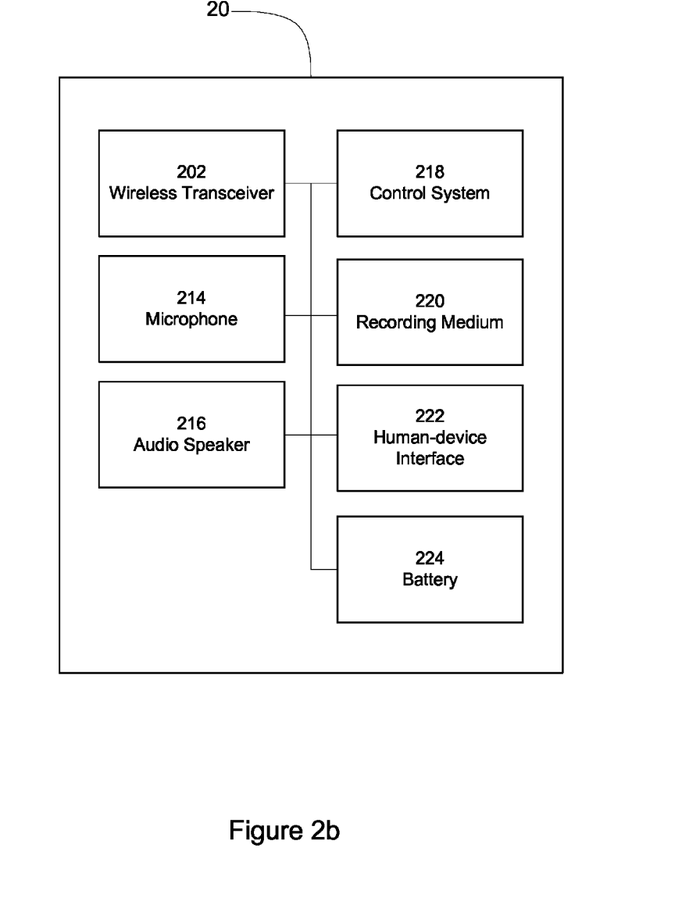
FIG. 2b is a schematic diagram of an example embodiment of a proximity-activated voice recording device according to some embodiments.
Figure 2C:
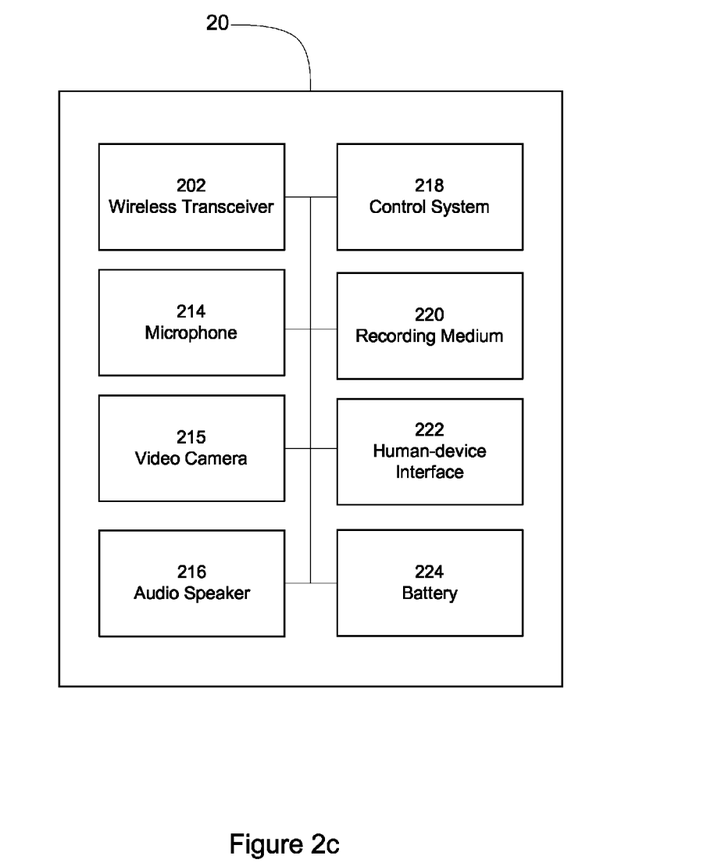
FIG. 2c is a schematic diagram of an example embodiment of a proximity-activated voice recording device according to some embodiments.

Detailed examples of exemplary proximity-activated voice recording devices are shown in FIGS. 2a, 2b, and 2c and described further below.

In some embodiments, a proximity-activated voice recording device may include a control system 218. The control system 218 may include electronic components such as a processor, storage media, non-transitory computer-readable media, etc. The control system 218 may be capable of executing a computer software program. The control system 218 may be used by the device 20 for a variety of purposes. In some embodiments, the control system 218 may include a global positioning system (GPS) receiver, for example, so that information pertaining to the location of a device 20 may be used.

According to some embodiments, a proximity-activated voice recording device 20 may include a first proximity sensor 204. A first proximity-activated voice recording device 20a may use a first proximity sensor 204 to detect when a second proximity-activated voice recording device 20b is within a proximity defined by a device communications distance $d_2$.

In some embodiments, a proximity-activated voice recording device 20 may use a wireless transceiver 202 and a control system 218 as a first proximity sensor. A first device 20a may detect that a second device 20b is within a proximity defined by a device communications distance $d_2$ by using a wireless transceiver 202 and a control system 218. For example, according to certain wireless communications protocols that may be included in wireless communications signals 16, the device communications distance $d_2$ may be implicitly or explicitly defined. If a first device 20a uses a certain wireless communications protocol, and the wireless communications protocol allows for the detection of a second device 20b, then the first device 20a and the second device 20b may be within a proximity defined by device communications distance $d_2$ whenever the first device 20a and the second device 20b are able to detect each other as provided by the wireless communications protocol.

A device communications distance $d_2$ may be defined as a maximum distance (or at least a significant distance related thereto) at which a first device 20a and a second device 20b can successfully send and receive wireless signals 16 between each other.

For example, first device 20a may send a wireless signal 16 using the wireless transceiver 202 of first device 20a; and second device 20b may use its wireless transceiver 202 to receive the wireless signal 16 send by first device 20a.

In some embodiments, if the particular type of wireless signal 16 (which may include a communications protocol) is limited to transmissions less than a maximum distance, than this maximum distance (or at least a significant distance related thereto) may be defined as device communications distance $d_2$.

According to some embodiments, when first device 20a detects that second device 20b is within a proximity no greater than device communications distance $d_2$ (and vice-versa), using, for example, the first proximity sensor 204, first device 20a and second device 20b may initiate wireless communications with each other, for example, by using wireless transceiver 202. This wireless communications may include hand-shaking, acknowledgement of a master-slave relationship between first device 20a and second device 20b, or other preliminary communications as may be determined by the communications protocol included within the wireless communications.

In some embodiments, device 20 may include the control system 218 in the performance of wireless communications, such as but not limited to preliminary communications.

According to some embodiments, when a first device 20a and a second device 20b are in communications with each other, for example according to a wireless communications protocol, the first device 20a and the second device 20b may exchange information related to their respective identification tokens 208.

For example, the identification token 208 of the first device 20a may include a first identification code for identifying the first device 20a, which may be a particular alphanumeric sequence, and which may be unique.

The identification token 208 of the first device 20a may also include a second identification code. The second identification code may correspond to a specific second device (i.e., second device 20b) with which the first device 20a has been programmed to be paired. For example, when the first device 20a determines that an identification code received from the second device 20b matches its second identification code, the first device 20a may pair itself with the second device 20b (and vice versa).

In some embodiments, a device 20 may use a control system 218 as an identification token. For example, the control system 218 may include a first identification code, and in some embodiments a second identification code. In some embodiments, the first device 20a may use a control system 218 in order to pair itself with the second device 20b (and vice versa).

According to some embodiments, identification codes may be derived, for example, from the media access control (MAC) address, or another networking address, or the identification codes may be established as part of a communications protocol.

In some embodiments, a device 20 may include a system for storing pre-determined pairing criteria. For example, the device 20 may use a control system 218 to determine and/or store pairing criteria. In some embodiments, a first user 12a may be able to program a first device 20a with identification codes.

Various embodiments of a device 20 may use an identification token 208 (or may for example use a control system 218 as an identification token) in which identification codes may be derived from personal attributes of users 12 and or 14. For example, an identification code may be derived from information derived from the image of the face of user 12 or user 14.

An identification code derived from the image of a user's face may be appropriate, for example, with embodiments that include a video camera 215, camera, or other image capturing device. In such a case, a first device 20a may use a control system 218 along with an identification code derived from the image of a second user's 12b face, in order to pair itself with the second device 20b, such as when an image of a second user's 12b face is captured by the video camera 215.

According to some embodiments, a proximity-activated voice recording device 20 may include a second proximity sensor 206. In some cases, a first proximity-activated voice recorder 20a may use a second proximity sensor 206 to detect when a second proximity-activated voice recording device 20b is within a proximity defined by a vocal communications distance $d_1$.

In some embodiments, a device 20 may use one or more of a wireless transceiver 202, a control system 218, a microphone 214, or an audio speaker 216, as a second proximity sensor. For example, a first proximity-activated voice recording device 20a may use a control system 218, a microphone 214, an audio speaker 216, or another suitable element to detect when a second proximity-activated voice recording 20b is within a proximity defined by a vocal communications distance $d_1$.

Various embodiments of a device 20 may use a wireless transceiver 202, a control system 218, a video camera 215, or other suitable elements as a second proximity sensor. For example, a first proximity-activated voice recording device 20a worn by a first user 12a may use a control system 218, a video camera 215, and so on to detect when the image of the face of a second user 12b has been captured by the video camera 215. The device 20 may interpret a pre-defined vocal communications distance $d_1$ in terms of the image captured by the video camera 215. For example, first device 20a may use the relative size of a user's face as captured in an image by the video camera 215 to detect when a second device 20b is within a proximity defined by a vocal communications distance $d_1$.

According to some embodiments, any of a first user 12a or a second user 12b or a third party may pre-define a vocal communications distance $d_1$. In some embodiments, a vocal communications distance $d_1$ may be determined by a proximity-activated device 20 itself, for example using a control system 218.

A vocal communications distance $d_1$ may be defined (for example by a first user 12a or by the device 20 itself) as a maximum distance (or at least a significant distance related thereto) at which first user 12a and second user 12b can successfully conduct vocal communications, for example, according to inter-human communications.

According to some embodiments, a proximity-activated voice recording device 20 may include a voice recorder 210. For example, a first proximity-activated voice recording device 20a may activate the voice recorder 210 to record sounds, when the second proximity sensor 206 determines that a second proximity-activated voice recording device 20b is within proximity of a vocal communications distance $d_1$.

In some cases, a video recorder or other image capturing device may also be used in place of, or in addition to, voice recorder 210.

In some embodiments, a device 20 may use a microphone 214, an audio speaker 216, a control system 218, a recording medium 220, or another suitable element as a voice recorder. For example, the control system 218 may activate the microphone 214 to detect a sound. The microphone 214 may produce an audio signal corresponding to the sound. The control system 218 may then store the audio signal on the recording medium 220.

In some embodiments, a first proximity-activated voice recording device 20a may activate a microphone 214, an audio speaker 216, a control system 218, a recording medium 220, or other suitable element to record sounds when the control system 218 determines that a second proximity-activated voice recording 20b is within proximity of a vocal communications distance $d_1$.

Various embodiments of a proximity-activated voice recording device 20 may use a video recorder in place of voice recorder 210. Device 20 may use a microphone 214, a video camera 215, an audio speaker 216, a control system 218, a recording medium 220, etc., as a video recorder. For example, the control system 218 may activate the microphone 214 to detect a sound, and the video camera 215 to detect an image. The microphone 214 and video camera 215 may produce an audio/video signal corresponding to the sound and images. The control system 218 may then store the audio signal on the recording medium 220.

According to some embodiments, a proximity-activated voice recording device 20 may include input and output ports 212. These input and output ports may be used for various multiple purposes, for example, to program an identification code in the identification token 208, or to download recordings from the voice recorder 210.

In some embodiments, a device 20 may use any of a wireless transceiver 202, a control system 218, a human-device interface 222, etc. as input and output ports, for various multiple purposes related to input and output functions. For example, in some cases the device 20 may be used, alone or together with a separate computing or communications device, in order to download stored sound recordings and other information from the device 20 to another storage medium, such as on another computer or communications device. In some embodiments, the device 20, alone or together with a separate computing or communications device, may upload stored sound recordings and other information to a cloud-based network computing infrastructure.

In some embodiments, the device 20 may include a battery 224 for powering the device 20.

In some embodiments, one or more of the devices 20 as described herein may be sized and shaped so as to be generally worn or carried by a user in a manner that may allow them to remain generally unnoticed. For example, some devices may be disguised as a piece of jewellery or other accessory (i.e., a watch, pen, clip, etc.) that can be worn or carried by a user in a manner such that the device may not be immediately recognizable as a recording device. This may further allow the device to blend into the background so as not to disturb or interfere with a conversation between to users.

Figure 3A:
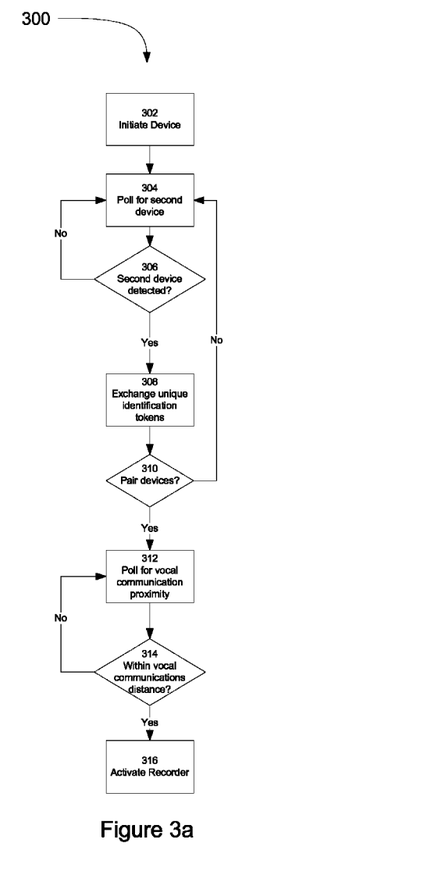
FIG. 3a is a flow diagram of a proximity-activated voice recording method according to some embodiments.

Referring now to FIG. 3a, an exemplary method 300 for operating a proximity-activated voice recording device (such as device 20) is shown therein according to one embodiment. The method 300 may begin with the initiation of a device at step 302 (for example, a first device 20a).

At step 304, the first device 20a polls for a second device with which to communicate. For example, step 304 may involve the use of the first proximity sensor 204 in order to determine if a second device 20b is within a proximity defined by device communications distance $d_2$.

In some embodiments, step 304 may use a control system 218 and a wireless transceiver 202 as a first proximity sensor. For example, step 304 may involve sending a wireless signal 16 via the wireless transceiver 202 and requesting a response from a second proximity-activated voice recording device 20b. In particular, the first device 20a may send a signal 16 which, if it is received by second device 20b, will cause second device 20b to reply to first device 20a with an acknowledgement signal or response. In such a case, if a second device 20b replies with an acknowledgement signal or response, then the fact that the first device 20a and second device 20b are within a mutual proximity defined by a device communications distance $d_2$ can be inferred.

In such cases the device communications distance $d_2$ may be defined to be a maximum distance (or at least a significant distance) at which the wireless signal 16 can be sent and an acknowledgment reply received between the first device 20a and the second device 20b.

In some examples, the first device 20a may periodically repeat step 304 at least once until the second device 20b is detected. When a second device 20b is detected (i.e. at step 306), the method 300 proceeds to step 308.

According to some embodiments, at step 308, the first device 20a and the second device 20b may exchange unique identification tokens 208. For example, a particular first device 20a may have been associated with a specific first user 12a, while a particular second device 20b may be associated with a specific second user 12b. Associating a specific first user 12a with a particular first device 20a and a specific second user 12b with a particular second device 20b can allow the devices 20a, 20b to determine the portions of a particular conversation being recorded that occurred between the first user 12a and second user 12b. In some embodiments, step 308 may use a control system 218 as an identification token.

In some embodiments, step 308 may involve validating that the identification token 208 of the second device 20b is actually associated with the second user 12b with whom first user 12a desires to have one or more conversations recorded.

At step 310, the first device 20a and the second device 20b can be paired if certain criteria are met for valid pairing. Various embodiments of step 310 may be possible. For example, in some cases valid pairing may require that the first device 20a recognizes the second device 20b, and that the first user 12a has previously identified the second device 20b as a device that should be paired with the first device 20a, particularly in contemplation that the second device 20b will be used by the second user 12b.

In some embodiments, valid pairing may occur when both the first device 20a and second device 20b validate each other's unique identification token. For example, this may be done to make the recording of conversations more difficult without the consent of both users 12a, 12b.

In other embodiments, a first device 20a may present a first user 12a with a list of multiple available devices 20 within a proximity no greater than the device communication distance $d_2$ that can be paired with the first device 20a. For example, a first device 20a may present a first user 12a with a list of multiple available devices 20 via the human-device interface 224. In such cases, for example, the first user 12a with the first device 20a may be prompted to select a second device 20b to pair with from a list of available other devices.

If, at step 310, two devices 20 that have exchanged unique identification tokens 208 during step 308 do not constitute a valid pair, then the method can return to step 304. For example, a first device 20a and a second device 20b may not have validated each other's unique identification token 208 within a particular period of time. If two devices 20 are within a proximity no greater than device communications distance $d_2$, and those two devices are unable to, or otherwise do not, validate each other's unique identification token, then for a particular embodiment, various techniques may help ensure that repeated attempts are made to pair the same two devices 20. For example, techniques may be used to ensure that when the two particular devices 20 are not paired, a continuous loop will not form between steps 304 and 310. Various techniques may be used, depending on particular embodiments, as will be appreciated by one of skill in the art.

Step 310 may pair a first device 20a and a second device 20b for the purposes of proximity-activated voice recording, which may be separate from any "pairing"-type step required for device communications, such as required by a particular communications protocol. For example, an established communications protocol such as Bluetooth may include a "pairing"-type step, which is separate from the pairing accomplished in step 310. According to some embodiments, a first device 20a and a second device 20b that have been paired are in a condition in which their recorders 210 can be activated. However, such activation may be dependent on, for example, the first device 20a and the second device 20b being within a mutual proximity defined by a vocal communications distance $d_1$. Once two devices 20 have been successfully paired during step 310, the method 300 may proceed to step 312.

Multiple different embodiments of step 312 are contemplated. For example, in some embodiments, the vocal communications distance $d_1$ may be pre-determined. In such a case, the mutual proximity of two devices 20 may be determined, for example, by using a second proximity sensor 206. The mutual proximity of a first devices 20a and a second device 20b, as determined by the second proximity sensor 206, can be compared to the pre-determined vocal communications distance $d_1$ in order to determine if the two devices 20 are within a proximity no greater than vocal communications distance $d_1$.

According to some embodiments, step 312 may include sending audio test signals between the first device 20a and the second device 20b. These audio test signals may be within or beyond a human audible frequency range, and may be transmitted by the audio speaker 216 on one device and received by the microphone 214 on the other device.

In some cases, an audio signal that is outside a human audible frequency range may be composed of any or all of a frequency, amplitude, or signal duration that is not detectable by a normal human ear. If an audio test signal is used, then vocal communications distance $d_1$ may be defined as a maximum distance (or at least a significant distance) at which the audio test signals can be successfully sent and received between two devices 20.

Various embodiments of step 312 may use a control system 218, a video camera 215, etc., to detect when a second device 20b is within a proximity defined by a vocal communications distance $d_1$.

According to some embodiments, the mutual proximity of two devices 20 may be determined using the location of each device 20, such as may be provided by a GPS system (not shown).

In some embodiments, the frequency, amplitude, duration, and so on of the audio test signal can be specifically selected in order to establish the conditions under which devices 20 will record a conversation between two users. In some cases, the audio test signal can be selected in order to reflect conditions such as ambient noise, the oral qualities of a person speaking, the aural qualities of a person listening to a conversation, or other parameters.

For example, if significant ambient noise is present, then the audio test signal may be adjusted so that the vocal communication distance $d_1$ can be appropriately selected for a conversation taking placing within the ambient noise.

In some embodiments, some or all of the audio test signal parameters can be adjusted automatically, for example, using the microphone 214 and the control system 218. According to some embodiments, devices 20 may use wireless communications signals 16 (for example sent by the wireless transceiver 202), to confirm or acknowledge that an audio test signal was successfully received at a particular device.

In some embodiments, during step 314, when an audio test signal is successfully sent and received between two devices 20, or in some embodiments, by both first device 20a and second device 20b, then devices 20 (e.g. 20a and 20b) are considered to be within proximity less than or equal to the vocal communications distance $d_1$.

In some embodiments, at step 316, one or more of the devices 20 may begin recording, for example, by activating the voice recorder 210, when two devices 20 are within a proximity no greater than vocal communications distance $d_1$.

Once a device 20 begins recording, subsequent steps may be performed. In particular, an exemplary method 350 for continuing to operate a proximity-activated voice recording device 20 is provided in FIG. 3b.

Figure 3B:
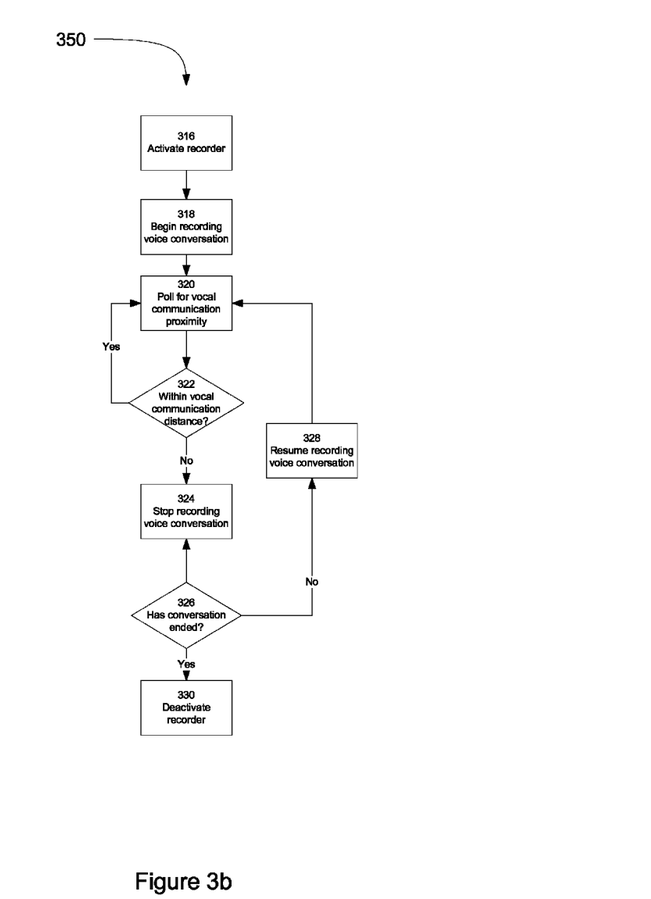
FIG. 3b is a flow diagram of a proximity-activated voice recording method according to some embodiments.

The method 350 may begin with the activation of a voice recorder 210, for example, as provided in FIG. 3b. At step 318, the method 350 begins to record the voice conversation (as well as ambient and other noises, although in some cases techniques may be used to supressed undesired audio).

According to some embodiments, it may be beneficial to periodically determine that the devices 20 (e.g. the first device 20a and second device 20b) are still within a proximity no greater than vocal communications distance $d_1$. This can be done, for example, by occasionally or periodically polling for vocal communication proximity at step 320.

At step 322, the method 350 determines whether the devices 20 are within a vocal communication proximity, for example, as previously discussed for step 314. If, during step 322, the devices 20 are determined to still be within vocal communications proximity, then the method returns to step 320, while continuing to record the conversation. However, if during step 322, the devices 20 are determined to be beyond the vocal communications proximity, then the method 350 can proceed to step 324, and the recording of the voice conversation may be stopped.

When, after step 322, the devices 20 are determined to be beyond the vocal communication proximity, and the recording is stopped during step 324, then, at step 326, the method 350 can determine whether the conversation has actually ended, or if, for example, the conversation has just paused while first user 12a and second user 12b are beyond the vocal communication proximity distance.

For example, during step 326, a timer may be used to delay the method 350 (i.e., for 10 seconds, 30 seconds, and so on), and after a particular delay, the method 350 may determine that the conversation has not ended, and then return to step 320. In some such cases, if step 326 is encountered twice (or more) within a specified period of time, then, at the second (or subsequent) occurrence of step 326, the method 350 may determine that the conversation has ended.

In other embodiments, during step 326, the user may be prompted to indicate whether the conversation has actually ended, for example, by using human-device interface 222. In some embodiments, the method 350 may determine that the conversation has ended if the devices 20 pass beyond the device communication distance $d_2$.

When the method determines that the conversation has not ended, then the method may proceed to step 328 and resumes recording. However, when the method 350 determines that the conversation has ended, then the method 350 can proceed to step 330, and the recorder is deactivated.

It should be understood that in other embodiments, one or more steps of the above described methods may be modified. In particular, one or more of the steps may be omitted, executed in a different order and/or in parallel, and there may be additional steps.

It should be understood that even though the embodiments are described herein in relation to proximity-activated voice recording devices and methods, they may be applicable in other fields of technology.

While the above description provides examples of one or more apparatus, methods, or systems, it will be appreciated that other apparatus, methods, or systems may be within the scope of the present description as interpreted by one of skill in the art.

The invention claimed is:

1. A proximity-activated voice recording system comprising at least two proximity-activated voice recording devices, each device comprising:

at least one of a control system and a wireless transceiver for detecting a proximity defined by a device communications distance; and, an identification token for identifying the voice-activated recording device;

at least one of the devices comprising a microphone; and at least one of the devices comprising a speaker for detecting a proximity defined by a vocal communications distance;

wherein the system is configured to:

detect when two devices are within the proximity as defined by the device communication distance, and then facilitate exchanging identification tokens between the two devices and enable pairing thereof;

detect when the two devices are within the proximity defined by the vocal communications distance by receiving an audio test signal sent from the speaker of one of the two devices using the microphone of the other of the two devices;

determine that the two devices are within the proximity defined by the vocal communications distance if the audio test signal is successfully received by the other of the two devices, and if so then activate one of the two device to record sounds.

2. The proximity-activated voice recording system of claim 1, wherein the control system of at least one device comprises second identification information pertaining to another voice-activated recording device such that the second identification information can be used to pair the at least one voice-activated recording device with the other voice-activated recording device.

3. The proximity-activated voice recording system of claim 1, wherein at least one proximity-activated voice recording device further comprises a human-device interface with which a user can receive information from or provide information to the at least one proximity-activated voice recording device.

4. The proximity-activated voice recording system claim 1, wherein at least one proximity-activated voice recording device further comprises a battery for powering the device.

5. The proximity-activated voice recording system of claim 1 wherein at least one proximity-activated voice recording device further comprises a video camera.

6. A method for operating a proximity-activated voice recording system, the method comprising the steps of:

detecting a second proximity-activated voice recording device when it is within a proximity to a first proximity-activated voice recording device, the proximity being defined by a device communications distance;

exchanging identification tokens between the first proximity-activated voice recording device and the second proximity-activated voice recording device to enable pairing of the first and second proximity-activated voice recording devices;

pairing the first and second proximity-activated voice recording devices;

detecting a second proximity-activated voice recording device when it is within a proximity to a first proximity-activated voice recording device defined by a vocal communications distance, comprising the steps of:

sending an audio test signal from a speaker of the first proximity-activated voice recording device;

receiving the audio test signal with the microphone of the second proximity-activated voice recording device;

determining that the second proximity-activated voice recording device is within the proximity to the first proximity-activated voice recording device defined by the vocal communications distance if the audio test signal is successfully received by the second proximity-activated voice recording device; and, activating at least one of the first and second proximity-activated voice recording devices when the first and second proximity-activated voice recording devices are within a mutual proximity defined by a vocal communications distance.

7. The method of claim 6 further comprising determining that the second proximity-activated voice recording device is not within a proximity to a first proximity-activated voice recording device defined by a vocal communications distance if and only if the audio test signal is not successfully received by the second proximity-activated voice recording device.

8. The method of claim 6 wherein the steps of detecting second proximity-activated voice recording device when it is within a proximity to a first proximity-activated voice recording device, the proximity being defined by a device communications distance; exchanging identification tokens between the first proximity-activated voice recording device and the second proximity-activated voice recording device to enable pairing of the first and second proximity-activated voice recording devices; and pairing the first and second proximity-activated voice recording devices are performed by a control system using a defined communications protocol.

9. The method of claim 8 wherein the defined communications protocol is Bluetooth.

10. A method for operating a proximity-activated voice recording system, the method comprising the steps of:

recording a conversation between a first user having a first proximity-activated voice recording device and a second user having a second proximity-activated voice recording device when the first and second proximity-activated voice recording devices are within a proximity defined by a vocal communications distance; periodically verifying that the first and second proximity-activated voice recording devices and the second proximity-activated voice recording device are within a mutual proximity defined by the vocal communications distance; and, ending the recording of the conversation when the first and second proximity-activated voice recording devices are separated by a distance greater than the vocal communications distance.

11. The method of claim 10 further comprising the step of:

at least one of uploading or downloading a voice recording from the first or second proximity-activated voice recording devices to a computing device or communications device.

12. The method of claim 11 wherein the computing device or communications device is a cloud-based networking device.

13. A proximity-activated voice recording system comprising at least two proximity-activated voice recording devices, each recording device wherein:

at least one device comprises a first proximity sensor for detecting a proximity defined by a device communications distance;

at least one device comprises an identification token that contains first identification information for identifying the voice-activated recording device; and, at least one device comprises a second proximity sensor for detecting a proximity defined by a vocal communications distance;

at least one device comprises a control system and a recorder, the control system configured to:

activate the recorder to record a conversation between a first user having a first device and a second user having a second device when the first and second devices are within the proximity defined by the vocal communications distance;

periodically verify that the first and second devices are within the proximity defined by the vocal communications distance; and, end the recording of the conversation when the first and second devices are separated by a distance greater than the vocal communications distance.

14. The proximity-activated voice recording system of claim 13, wherein the identification token of at least one device comprises second identification information pertaining to another voice-activated recording device.

15. The proximity-activated voice recording system of claim 14, wherein at least one of the devices is operable to use the second identification information to pair the at least one voice-activated recording device and the other voice-activated recording device.

16. The proximity-activated voice recording system of claim 13, wherein at least one proximity-activated voice recording device further comprises a wireless transceiver for communicating with another proximity-activated voice recording device.

17. The proximity-activated voice recording system of claim 13, wherein at least one proximity-activated voice recording device further comprises at least one of input and output ports for providing various input and output functions.

* * * * *